US012188277B2

(12) United States Patent
Reissig

(10) Patent No.: US 12,188,277 B2
(45) Date of Patent: Jan. 7, 2025

(54) FURNITURE DRIVE FOR MOVING A FURNITURE PART THAT IS MOVABLY MOUNTED RELATIVE TO A FURNITURE BODY

(71) Applicant: Julius Blum GmbH, Hoechst (AT)

(72) Inventor: Matthias Reissig, Lindau (DE)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/135,397

(22) Filed: Apr. 17, 2023

(65) Prior Publication Data

US 2023/0258035 A1 Aug. 17, 2023

Related U.S. Application Data

(63) Continuation of application No. PCT/AT2021/060383, filed on Oct. 15, 2021.

(30) Foreign Application Priority Data

Oct. 22, 2020 (AT) .................................. 50913/2020

(51) Int. Cl.
*E05F 1/10* (2006.01)
*E05F 1/12* (2006.01)

(52) U.S. Cl.
CPC ......... *E05F 1/1246* (2013.01); *E05Y 2900/20* (2013.01)

(58) Field of Classification Search
CPC ........................... E05Y 2900/20; E05F 1/1246
See application file for complete search history.

(56) References Cited

U.S. PATENT DOCUMENTS 8,590,107 B2 11/2013 Omann
9,498,062 B2 * 11/2016 Baldreich .............. A47B 96/00
9,719,283 B2 * 8/2017 Holzapfel .............. A47B 96/00
(Continued)

FOREIGN PATENT DOCUMENTS

CN 210768305 6/2020
DE 20 2010 005 934 9/2010
(Continued)

OTHER PUBLICATIONS

International Search Report issued Jan. 14, 2022 in International (PCT) Application No. PCT/AT2021/060383.

*Primary Examiner* — Jason W San
(74) *Attorney, Agent, or Firm* — Wenderoth, Lind & Ponack, L.L.P.

(57) ABSTRACT

A furniture drive includes a housing which can be arranged on a furniture panel, an actuator arm movably mounted relative to the housing and to which a movable furniture part can be secured, a force accumulator device which can be used to exert a force onto the actuator arm, an adjustment device for adjusting the force which can be exerted onto the actuator arm by the force accumulator device, and a display device which can be used to display a force setting that can be perceived by the adjustment device. The housing has a support surface to bring the furniture drive into contact with the furniture panel, the housing has a housing face oriented transversely to the support surface, and the display device is arranged relative to the housing face such that the display device can be read in a viewing direction facing the housing face.

23 Claims, 9 Drawing Sheets

(56) References Cited

U.S. PATENT DOCUMENTS

| | | | | |
|---|---|---|---|---|
| 9,909,346 | B2 * | 3/2018 | Holzapfel | E05F 1/1058 |
| 10,294,705 | B2 * | 5/2019 | Hirtsiefer | E05D 3/16 |
| 10,407,962 | B2 * | 9/2019 | Schluge | E05F 1/1058 |
| 10,487,554 | B2 | 11/2019 | Lubetz et al. | |
| 10,494,846 | B2 * | 12/2019 | Schmid | E05D 3/16 |
| 10,662,690 | B2 * | 5/2020 | Schluge | E05F 1/1253 |
| 10,731,392 | B2 | 8/2020 | Salice | |
| 11,060,337 | B2 | 7/2021 | Sobolewski et al. | |
| 11,248,406 | B2 * | 2/2022 | Nordieker | E05F 1/1261 |
| 11,525,295 | B2 | 12/2022 | Nordieker et al. | |
| 11,808,074 | B2 * | 11/2023 | Hirtsiefer | E05D 7/125 |
| 2011/0193458 | A1 * | 8/2011 | Omann | E05D 15/401 49/386 |
| 2014/0317883 | A1 * | 10/2014 | Baldreich | E05F 1/1058 16/280 |
| 2014/0366322 | A1 * | 12/2014 | Salice | E05F 5/02 16/277 |
| 2015/0096147 | A1 * | 4/2015 | Rohner | E05F 5/006 16/233 |
| 2015/0351539 | A1 * | 12/2015 | Baldreich | E05F 1/1058 312/319.2 |
| 2016/0160551 | A1 * | 6/2016 | Lutz | E05D 15/40 185/37 |
| 2017/0049232 | A1 * | 2/2017 | Rihtarec | A47B 88/463 |
| 2017/0051813 | A1 * | 2/2017 | Karu | E05F 1/16 |
| 2017/0204645 | A1 * | 7/2017 | Lubetz | F16H 25/18 |
| 2017/0247923 | A1 * | 8/2017 | Hirtsiefer | E05D 3/16 |
| 2017/0292307 | A1 * | 10/2017 | Hirtsiefer | E05F 1/12 |
| 2018/0298661 | A1 * | 10/2018 | Salice | E05F 1/1058 |
| 2019/0178016 | A1 * | 6/2019 | Salice | E05D 15/40 |
| 2020/0123827 | A1 | 4/2020 | Sobolewski et al. | |
| 2020/0131830 | A1 * | 4/2020 | Byun | E05D 11/0054 |
| 2021/0010311 | A1 * | 1/2021 | Nordieker | E05F 3/20 |
| 2021/0123275 | A1 * | 4/2021 | Hammerer | E05F 1/1246 |
| 2022/0074248 | A1 * | 3/2022 | Holzapfel | E05D 5/0276 |
| 2022/0251890 | A1 * | 8/2022 | Hirtsiefer | E05C 19/022 |
| 2022/0259905 | A1 * | 8/2022 | Hirtsiefer | E05F 1/1058 |
| 2022/0259909 | A1 * | 8/2022 | Hirtsiefer | E05F 5/02 |
| 2022/0307309 | A1 * | 9/2022 | Hirtsiefer | E05F 5/10 |
| 2023/0030015 | A1 * | 2/2023 | Boesch | E05F 1/1261 |
| 2023/0045499 | A1 * | 2/2023 | Gabel | E05F 1/1261 |
| 2023/0258035 | A1 * | 8/2023 | Reissig | E05D 15/40 16/72 |
| 2023/0272649 | A1 * | 8/2023 | Baldreich | E05D 15/40 312/325 |
| 2024/0052686 | A1 * | 2/2024 | Korda | A47B 46/00 |

FOREIGN PATENT DOCUMENTS

| | | |
|---|---|---|
| DE | 21 2017 000 269 | 8/2019 |
| EP | 4 139 549 | 5/2024 |
| JP | 2011-214376 | 10/2011 |
| JP | 2012-507644 | 3/2012 |
| JP | 2016-507017 | 3/2016 |
| JP | 2017-536492 | 12/2017 |
| JP | 2019-525040 | 9/2019 |
| WO | 2010/051569 | 5/2010 |
| WO | 2014/121309 | 8/2014 |
| WO | 2016/077851 | 5/2016 |
| WO | 2016/174076 | 11/2016 |
| WO | 2018/107189 | 6/2018 |
| WO | 2018/192819 | 10/2018 |

* cited by examiner

FURNITURE DRIVE FOR MOVING A FURNITURE PART THAT IS MOVABLY MOUNTED RELATIVE TO A FURNITURE BODY

BACKGROUND OF THE INVENTION

The invention relates to a furniture drive for moving a furniture part that is movably mounted relative to a furniture carcass, in particular a furniture flap that can be pivoted about a horizontal axis relative to the furniture carcass. The furniture drive includes a housing, which can be arranged on a furniture panel of the furniture carcass, at least one actuating arm, which is movably mounted relative to the housing and to which the movable furniture part can be fastened, at least one energy storage device, with which a force can be exerted on the at least one actuating arm, at least one setting device for setting the force that can be exerted on the at least one actuating arm by the at least one energy storage device, and at least one display device, with which a force setting that can be made by means of the at least one setting device can be displayed. Furthermore, the invention relates to a piece of furniture with a furniture carcass and at least one furniture part that is movably mounted relative to the furniture carcass, in particular at least one furniture flap that can be pivoted about a horizontal axis relative to the furniture carcass when the piece of furniture is in a usage position.

Such a furniture drive is already known from the document DE 20 2010 005 934 U1, in which a force setting of an actuating arm can be read via an opening in a further housing side of the housing oriented parallel to a contact surface. The force setting can be manipulated by way of a setting device, wherein the force setting due to an application point, visible through the further housing side, of an energy storage device on an intermediate lever can be read via a position relative to a scale located on the further housing side.

A disadvantage of the state of the art is that contaminants can enter the furniture drive through the opening in the further housing side, whereby the risk exists of impaired functionality and/or of a reduced service life of the furniture drive. Moreover, an aesthetic appearance or look of the furniture drive is diminished, wherein in the case of a completely closed further housing side, reading of the force setting is possible only via laborious disassembly and subsequent re-assembly of the further housing side, wherein however no reference is given to the scale. Furthermore, in the case of tall pieces of furniture and/or pieces of furniture on which furniture drives are arranged very deep or in a manner difficult to access, it becomes difficult to read the force setting, wherein due in particular to differing viewing directions of users of a different size—caused by varying eye levels—significant parallax effects are generated when reading the force setting, whereby no sufficiently precise reading of the force setting can be achieved.

The objective technical problem of the present invention therefore consists in specifying a furniture drive that is improved compared with the state of the art and in which the disadvantages of the state of the art are at least partly remedied, and which is distinguished in particular by a display device that can be read in a user-friendly manner, in order to be able to use the furniture drive, for example, more flexibly on pieces of furniture with an enhanced look compared with the state of the art and with the possibility of being able to read the force setting more precisely.

SUMMARY OF THE INVENTION

It is accordingly provided according to the invention that the housing has a contact surface with which the furniture drive can be brought into contact with the furniture panel and the housing has at least one housing side oriented transversely to the contact surface. The at least one display device is arranged relative to this at least one housing side such that the at least one display device can be read when looking in the direction of this at least one housing side.

It is only thereby made possible that at least one further housing side, which is oriented, for example, parallel to the contact surface, can be formed completely closed and an ingress of contaminants into the furniture drive can be impeded. If the at least one housing side is located in a usage position, in which the furniture drive is arranged on the furniture panel, on an underside of the furniture drive, dust and contaminants can be prevented particularly effectively from reducing a functionality and/or service life of the furniture drive.

Added to this is the positive attribute that reading of the force setting is independent of the explicit design of the at least one further housing side, wherein even with at least one further housing side that is completely closed, reading of the force setting can be achieved conveniently by looking at the at least one housing side. Furthermore, parallax effects can be reduced in a particularly advantageous manner.

As stated at the beginning, protection is also sought for a piece of furniture with a furniture carcass and at least one furniture part movably mounted relative to the furniture carcass, in particular at least one furniture flap that can be pivoted about a horizontal axis relative to the furniture carcass in a usage position of the piece of furniture, wherein the piece of furniture has at least one such furniture drive, wherein the furniture carcass has at least one, in particular vertically arranged, furniture panel and the housing of the at least one furniture drive is arranged on the furniture panel, and wherein the at least one furniture part is or can be fastened to the at least one actuating arm of the at least one furniture drive, wherein the at least one furniture part can be moved by the at least one furniture drive relative to the furniture carcass.

To identify the present force setting of the at least one furniture drive, it is only necessary that the at least one housing side is accessible, wherein a user, by looking at the at least one display device, can generate information on the present setting of the force that can be exerted on the at least one actuating arm by the at least one energy storage device. It is also conceivable that the at least one furniture drive is covered in areas to enhance the aesthetic appearance, wherein the at least one display device can be read through the at least one housing side and/or the force setting can be adjusted, for example, via a front side.

Preferably, the at least one setting device—preferably in a usage position of the furniture drive, in which the housing is arranged on the furniture panel of the furniture carcass—can be actuated from a front side, preferably via a front side opening in the housing, wherein the front side is preferably arranged transversely to the contact surface and the housing side.

If a manipulation of the force setting is undertaken via the front side by the at least one setting device, the setting of the force setting can be generated in a particularly convenient manner. For example, the at least one setting device can be actuated by a screwdriver through the front side opening, wherein the at least one display device displays the changed force setting on the at least one housing side, which is particularly preferably inclined by substantially 90 degrees to the front side.

Furthermore, it is particularly preferable that the housing comprises at least one further housing side. The at least one further housing side is arranged parallel to the at least one contact surface and a side of the furniture drive can be covered, at least in areas, by the at least one further housing side.

The at least one further housing side is not necessary either for the force setting by way of the at least one setting device or for reading the force setting via the at least one display device. A disassembly of the at least one further housing side can be required only for maintenance purposes and/or the at least one further housing side can be formed opaque and/or closed.

The at least one further housing side can generally comprise folds and/or connecting pieces, for example, with which, in addition to the side of the furniture drive, further sides of the furniture drive are concealed, and/or can be formed separate from the housing or by the housing.

Advantageously, the at least one display device is formed, preferably spatially, separate from the at least one setting device.

The at least one display device can thereby consist of another material, for example to reduce a weight of the furniture drive, and/or can be serviced in a particularly advantageous manner in the event of a change in the at least one energy storage device.

The at least one display device is particularly preferably formed separate from the at least one energy storage device, the at least one actuating arm and/or a transfer member that may be present, such as an intermediate lever. In general, however, the at least one display device can also be connected in a materially-bonded manner to the at least one setting device, the at least one energy storage device, the at least one actuating arm and/or the transfer member that may be present.

According to an advantageous design of the invention, the at least one actuating arm comprises at least one toothed wheel for moving the at least one actuating arm out of a first relative position into a second relative position separate from the first relative position, wherein it is preferably provided that the at least one toothed wheel contacts the at least one setting device indirectly or directly.

The at least one toothed wheel can generally comprise a transmission with which a transmission of force of the at least one energy storage device to the at least one actuating arm can be generated in a particularly advantageous manner for an energy-saving movement of the movable furniture part.

Through the at least one toothed wheel, a linear movement and/or a pivoting movement—initiated by the at least one energy storage device—can be transferred into a rotational movement of the at least one actuating arm. However, the at least one actuating arm can generally also comprise linear movement sequences.

In an advantageous manner, the at least one setting device has at least one transfer member, wherein the at least one energy storage device can be arranged on the at least one transfer member and/or the at least one transfer member can be arranged on the at least one actuating arm, preferably by way of a control curve of the at least one transfer member.

Through the at least one transfer member, an application point of the at least one energy storage device on the at least one actuating arm can be displaced, whereby a changed force arm from the at least one energy storage device acts on the at least one actuating arm and an increased or reduced force can be generated for moving the movable furniture part. Furthermore, the at least one energy storage device can already exist in a partially relieved state or have an increased pretensioning due to the changed application point, with the result that a transmission of force to the at least one actuating arm can be adapted according to requirements of the movable furniture part.

By way of a control curve, a transmission of force to the at least one actuating arm can be manipulated in a particularly advantageous manner during a movement of the at least one actuating arm, wherein the control curve particularly preferably has at least two regions of differing geometry, such as curvature or gradient, in order to be able to influence a force action curve particularly advantageously. In general, however, the control curve can also exist in the form of an indentation, with the result that the at least one actuating arm is moved in a defined manner by the at least one setting device and/or, in the case of a movement of the at least one actuating arm, is positioned in a defined manner relative to the at least one setting device.

It has proved advantageous that the at least one energy storage device can be moved, preferably by way of an adjustment device, along an application line of the at least one setting device, preferably of at least one transfer means that may be present, to change a force transmission torque on the at least one actuating arm, wherein the at least one adjustment device can be moved by way of the at least one setting device, preferably in a translatory manner.

The adjustment device particularly preferably acts as a coupling element between the at least one setting device and the at least one energy storage device. A relative position between the at least one energy storage device and the at least one setting device can be adjusted by way of the at least one setting device, in order, for example, to displace the application point of the at least one energy storage device relative to the at least one actuating arm.

According to an advantageous embodiment of the invention, at least one damping device, which can be or is arranged on the at least one setting device, the at least one energy storage device and/or the at least one actuating arm, is arranged on the housing.

Through the at least one damping device, a harmonious movement of the at least one actuating arm can be achieved, wherein abrupt movements that may damage component parts of the furniture drive are suppressed.

It has proved advantageous that the at least one display device can be arranged, at least in areas, on the at least one energy storage device and/or the at least one setting device. Preferably, the at least one display device is formed, particularly preferably completely, from metal.

The at least one display device can contact the at least one energy storage device, for example indirectly, via the adjustment device. It is generally also conceivable that the at least one display device is arranged, preferably indirectly, on the at least one energy storage device or the at least one setting device, wherein a change in the force setting is transmitted to the at least one display device.

An advantageous variant consists therein that the at least one display device is mounted rotatably on the housing and/or the at least one setting device.

It is thereby made possible that a change in the force setting can be translated into a rotational movement of the at least one display device. For example, the at least one display device can have on the circumference a, preferably curved, scale, which is rotated or pivoted relative to a component part of the furniture drive, whereby the force setting can be read via a position of the scale relative to the component part.

It is particularly preferred that the at least one display device is arranged at least in areas, preferably completely, inside the housing, and the at least one display device can be read through at least one opening in the housing.

It is thereby made possible that the kinematics of the display device can remain concealed inside the housing and only the information required for the force setting is accessible to a user of the furniture drive.

In an embodiment of the invention, the at least one display device comprises at least one, particularly preferably curved, plate-shaped extension, preferably in the form of a sheet metal part, for transmitting a force setting of the at least one setting device to the at least one display device.

By way of a curvature of the at least one plate-shaped extension, a transmission of the force setting to a scale to be read can be achieved in a particularly advantageous manner through an interaction of the at least one energy storage device and/or the at least one setting device and the at least one plate-shaped extension on contacting during a movement—initiated by the at least one setting device.

According to a preferred embodiment of the invention, the at least one plate-shaped extension can be moved by a movement of the at least one energy storage device, preferably by way of at least one adjustment device that may be present and/or in a rotating manner, relative to the at least one setting device.

It has proved advantageous that the at least one display device comprises at least one scale, and the at least one scale is movable relative to the housing when the force that can be exerted on the at least one actuating arm by the at least one energy storage device is set by the at least one setting device, wherein it is preferably provided that the at least one scale is designed curved, particularly preferably convex.

In the state of the art, a scale is arranged on the housing, wherein the scale must be made very long in order to be able to display wide ranges of a force setting. In this case, the solution with a scale arranged on the at least one display device provides a reduction in visible parts for determining the force setting, and preferably only the range of the at least one scale that is required for determining the force that can be exerted on the at least one actuating arm by the at least one energy storage device is visible. This can be guaranteed, for example, by at least one opening in the housing side through which only the relevant partial range of the at least one scale can be read.

Furthermore, preferably the at least one scale and the at least one plate-shaped extension are formed spatially separate from one another.

According to an advantageous design of the invention, the housing comprises at least one marking with which a force setting that can be made by the at least one setting device can be read through a position of the at least one display device, preferably of at least one scale that may be present, relative to the at least one marking.

The at least one marking and/or the at least one scale can be made, for example, in an embossed, stamped, drilled, stuck-on, painted-on, engraved or similar manner.

In a further embodiment, the at least one setting device comprises an adjustment device, preferably in the form of a tool receiver, which can particularly preferably be actuated from the front side. The setting of the force that can be exerted on the at least one actuating arm by the at least one energy storage device can be set by way of the adjustment device.

Through the adjustment device, a force setting can be adapted in a user-friendly manner—for example, via an actuation of the tool receiver by a screwdriver—to the desired force setting.

BRIEF DESCRIPTION OF THE DRAWINGS

Further details and advantages of the present invention are explained in more detail below by means of the description of the figures with reference to the embodiments represented in the drawings, in which.

DETAILED DESCRIPTION OF THE INVENTION

Figure 1A:
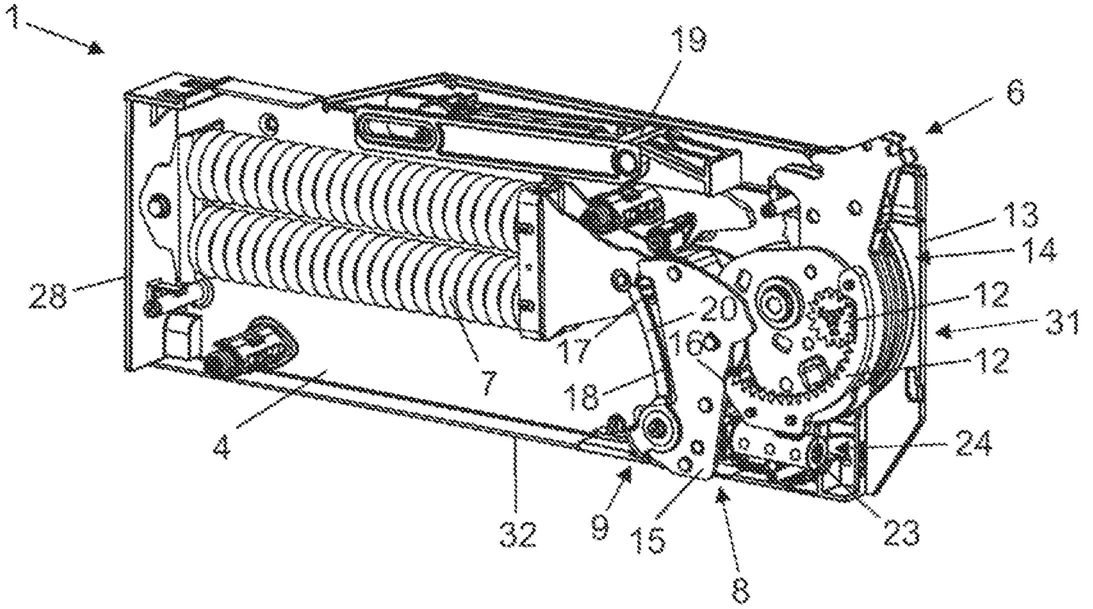
FIGS. 1_a_-1_b_ show a furniture drive according to a preferred embodiment with a setting device arranged between an actuating arm and an energy storage device as well as a display device in a first force setting, wherein a lateral face of the housing is removed for illustration, in a perspective view and an enlarged detail of the perspective view, FIGS. 2_a_-2_b_ show the furniture drive according to the embodiment according to FIG. 1_a_ in a second force setting in a perspective view and an enlarged detail of the perspective view.

FIG. 1_a_ shows a furniture drive 1 for moving a furniture part 3 that is movably mounted relative to a furniture carcass 2, comprising a housing 4 which can be arranged on a furniture panel 5 of the furniture carcass 2, an actuating arm 6 that is movably mounted relative to the housing 4 and an energy storage device 7 with which a force can be exerted on the actuating arm 6.

The furniture drive 1 has a setting device 8 for setting the force that can be exerted on the actuating arm 6 by the energy storage device 7, wherein a display device 9 is provided with which a force setting that can be set by the setting device 8 can be displayed.

The housing 4 of the furniture drive 1 has a contact surface 31 with which the furniture drive 1 can be brought into contact with the furniture panel 5. The housing 4 also has a housing side 32 oriented transversely to the contact surface 31, and the display device 9 is arranged relative to the housing side 32 that the display device 9 can be read when looking in the direction of the housing side 32.

Figure 1B:
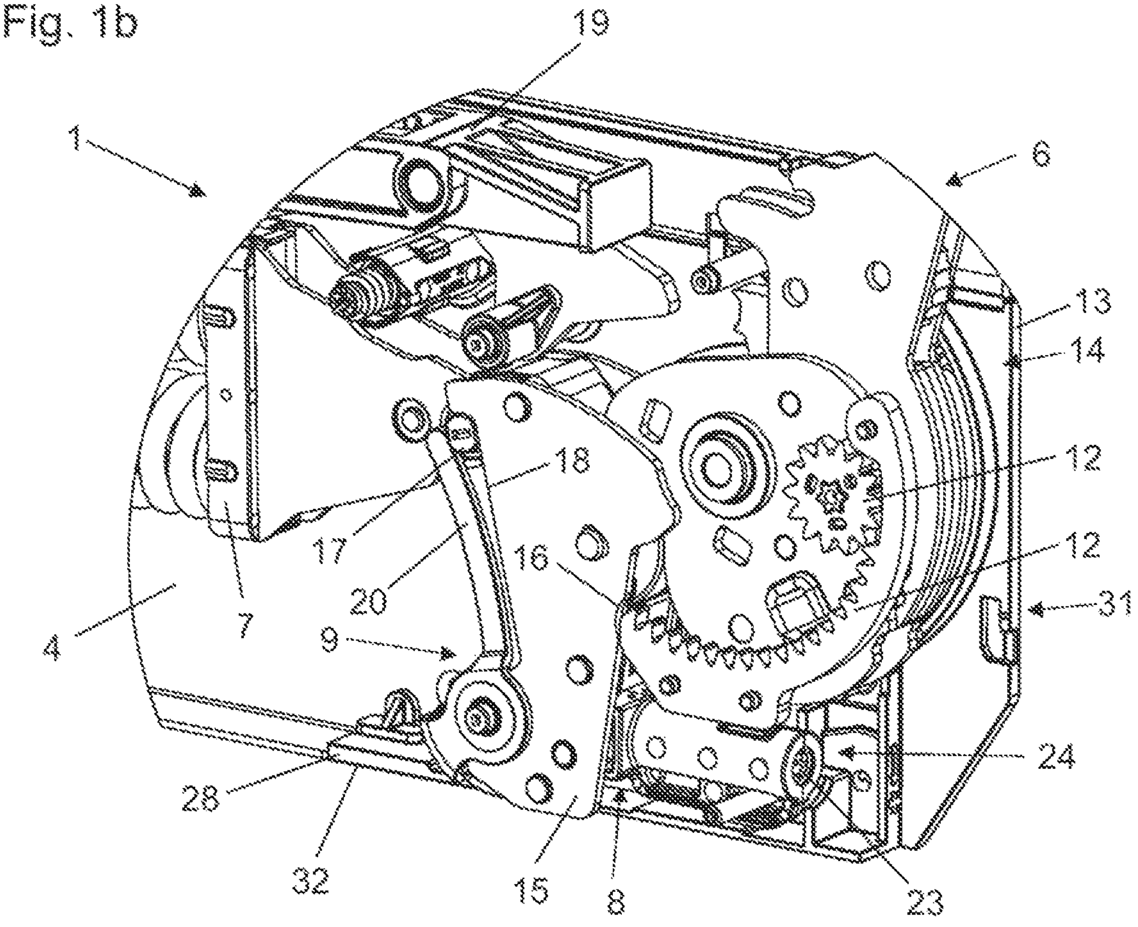

FIG. 1*b* shows a partial area of the furniture drive according to FIG. 1*a* that is represented enlarged. Here, it can be seen that the display device 9 is formed separate from the setting device 8, the energy storage device 7, and the actuating arm 6. The display device 9 is mounted rotatably on the setting device 8 and contacts the energy storage device 7 by way of an adjustment device 17.

The actuating arm 6 comprises two toothed wheels 12 for moving the actuating arm 6 from a first relative position to a second relative position separate from the first relative position. A movement of the actuating arm 6 is made possible between an open position of the movable furniture part 3 and a closed position, and vice versa. A first toothed wheel 12 contacts the setting device 8 directly by way of a control curve 16 in the form of an indentation in a transfer member 15 of the setting device 8. The transfer member 15 can generally also comprise a control curve 16, which makes a transmission of force to the movable furniture part 3 possible, which transmission is changed via a change in the relative position.

The transfer member 15 of the setting device 8 contacts the energy storage device 7, and the energy storage device 7 can be moved in a translatory manner by the adjustment device 17 along an application line 18 of the transfer member 15 of the setting device 8. The translatory movement can generally be overlaid by a pivoting movement. Through a movement of the adjustment device 17 along the application line 18, a force transmission torque on the actuating arm 6 is changed, as the application point of the energy storage device 7 is displaced relative to the actuating arm 6.

The adjustment device 17 can be moved in a translatory manner by way of the setting device 8, and the furniture drive 1 is present in a first force setting and the energy storage device 7 acts on the transfer member 15 at the top in the representation. This corresponds to a low force setting.

Figure 2A:
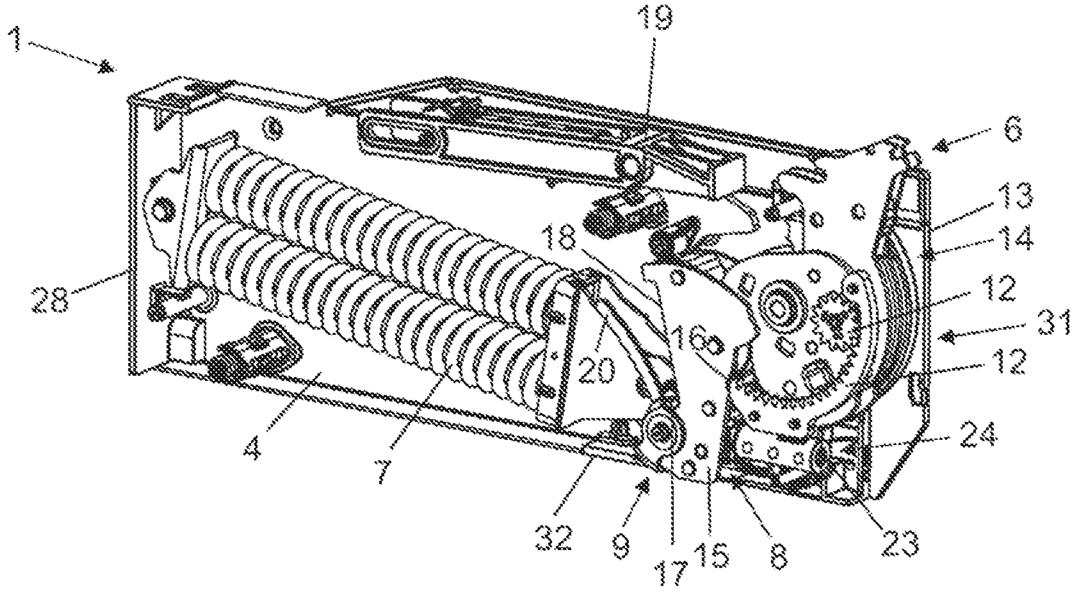

FIG. 2*a* shows the furniture drive 1 in a changed force setting with an increased transmission of force of the energy storage device 7 to the actuating arm 6 relative to FIG. 1*a*. In this case, the energy storage device 7 acts on the transfer member 15 at the bottom in the representation and transmits force to the actuating arm 6 via the force setting device 8.

Arranged on the housing 4 is a damping device 19, which is arranged on the actuating arm 6 and indirectly on the setting device 8 during a damping movement. However, the damping device 19 can generally also be arranged on the energy storage device 7.

The display device 9 is rotatably mounted on the housing 4 by way of the further housing side 27 (not represented for reasons of clarity) and on the setting device 8. The display device 9 can generally also be arranged on the energy storage device 7.

The display device 9 is formed completely from metal.

The setting device 8 is arranged by the adjustment device 17 on the energy storage device 7 and by way of the transfer member 15 on the actuating arm 6.

Figure 2B:
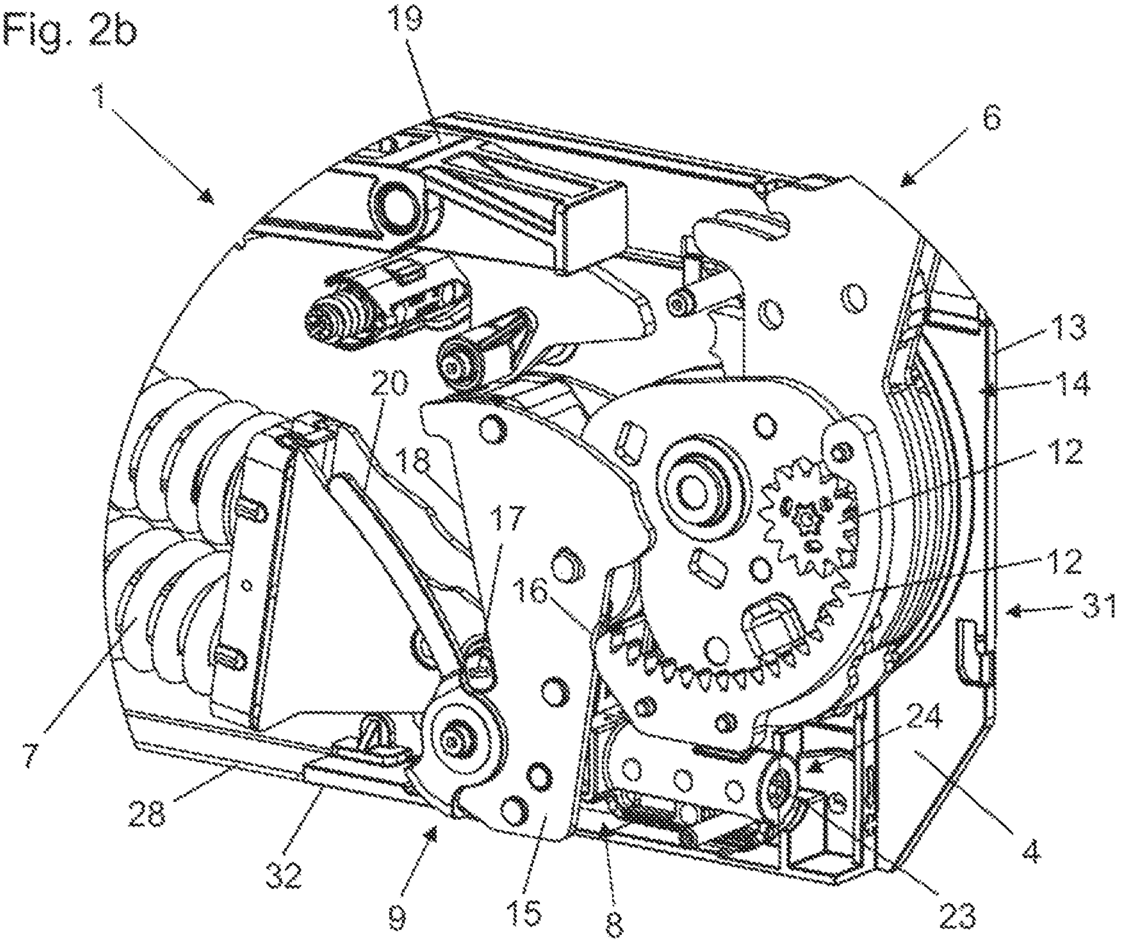

FIG. 2*b* differs from FIG. 2*a* only to the extent that an enlarged section of the furniture drive 1 is represented.

If the display device 9 moves during a movement of the actuating arm 6—for example, in the case of a changed opening angle of the movable furniture part 3—it is possible that the display device 9 is moved relative to the housing 4, with the result that a force setting made by the setting device 8 is displayed in a varying manner on the display device 9. This does not pose a problem, however, as a user of the furniture drive only has to read the force setting of the furniture drive 1 in a specific position of the actuating arm 6 to be able to deduce the force setting. Consequently, a display on the display device 9 may by no means depend exclusively on the force setting of the setting device 8. However, the display device 9 provides information about the present force setting.

In practice, it is particularly relevant how the force setting of two corresponding furniture drives 1 was undertaken relative to one another. It is accordingly sufficient to compare the force setting via the display devices 9 of the two furniture drives 1 with one another in a desired position of the actuating arms 6. In the case of different information through the display devices 9, the force setting of one of the two furniture drives 1 can be adapted by the setting device 8 by adjusting the application point of the energy storage device 7 on the related actuating arm 6, with the result that in the same position of the actuating arms 6, an identical force setting can be read through the display devices 9.

Figure 3:
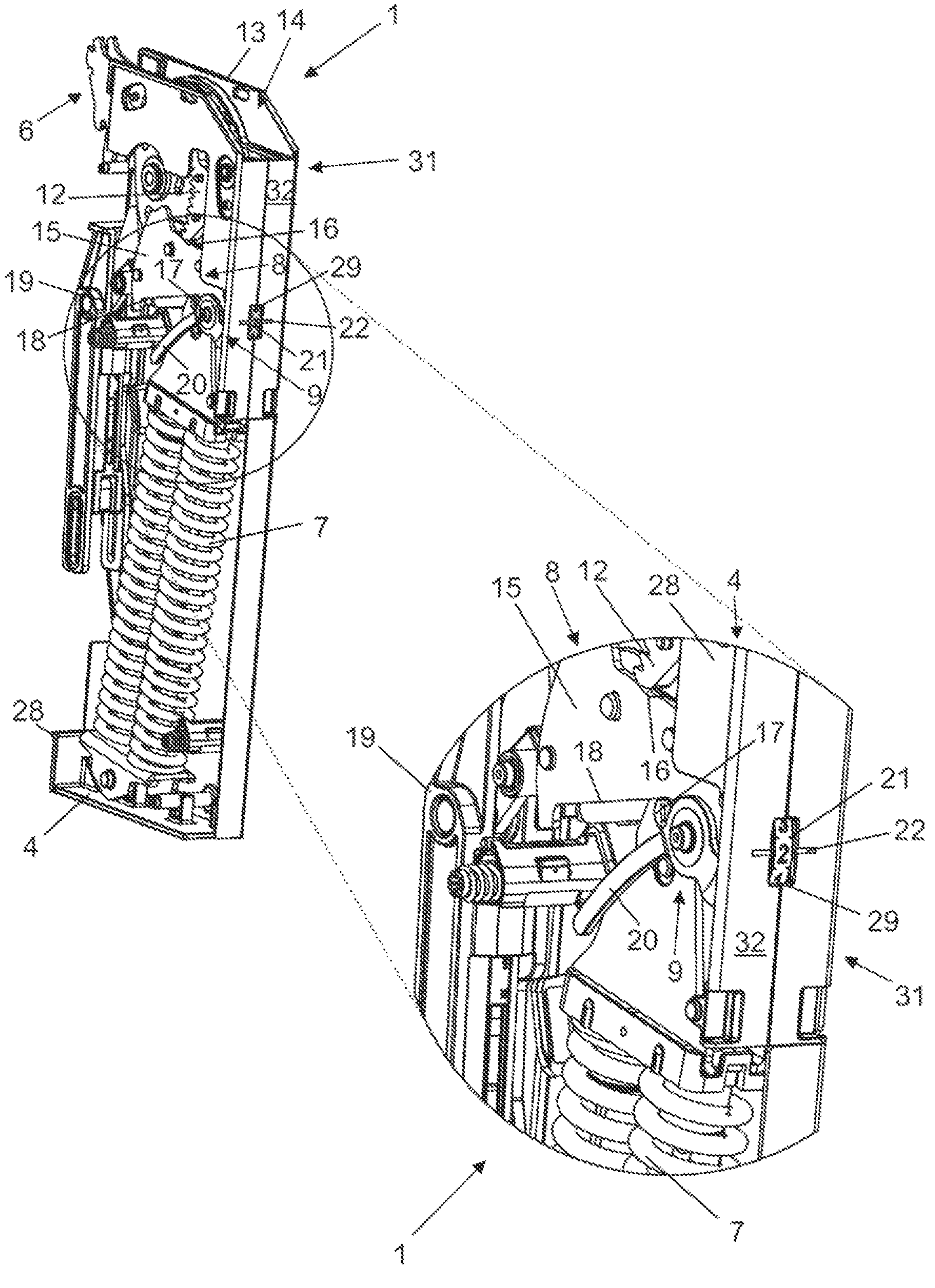
FIG. 3 shows the furniture drive according to the embodiment according to FIG. 2_a_ in a further perspective view with an enlarged detail of an underside of the housing.

FIG. 3 shows the furniture drive 1 when looking in the direction of the housing side 32, wherein the display device 9 is arranged inside the housing 4 and can be read through an opening 29 in the housing 4. The opening 29 is generally of any desired shape. The display device 9 can generally protrude through the opening 29 or be located inside the housing 4 and visible via the opening 29; the display device 9 is particularly preferably arranged in the opening 29.

The display device 9, which is separate from the housing 4, comprises a scale 21. The scale 21 is moved relative to the housing 4 when the force that can be exerted on the actuating arm 6 by the energy storage device 7 is set by the setting device 8. The scale 21 is designed convexly curved. The scale 21 is independent of the housing 4, but a scale 21 arranged on the housing side 32 is also conceivable, by which a relative position of the display device 9—for example, by a marking on the display device 9—relative to this scale 21, a force setting can be read from an underside of the housing 4.

The housing 4 comprises two markings 22, which are arranged on the housing side 32 and with which a force setting that can be made by the setting device 8 can be read by a relative position of the display device 9 via the scale 21 to the marking 22.

Figure 4:
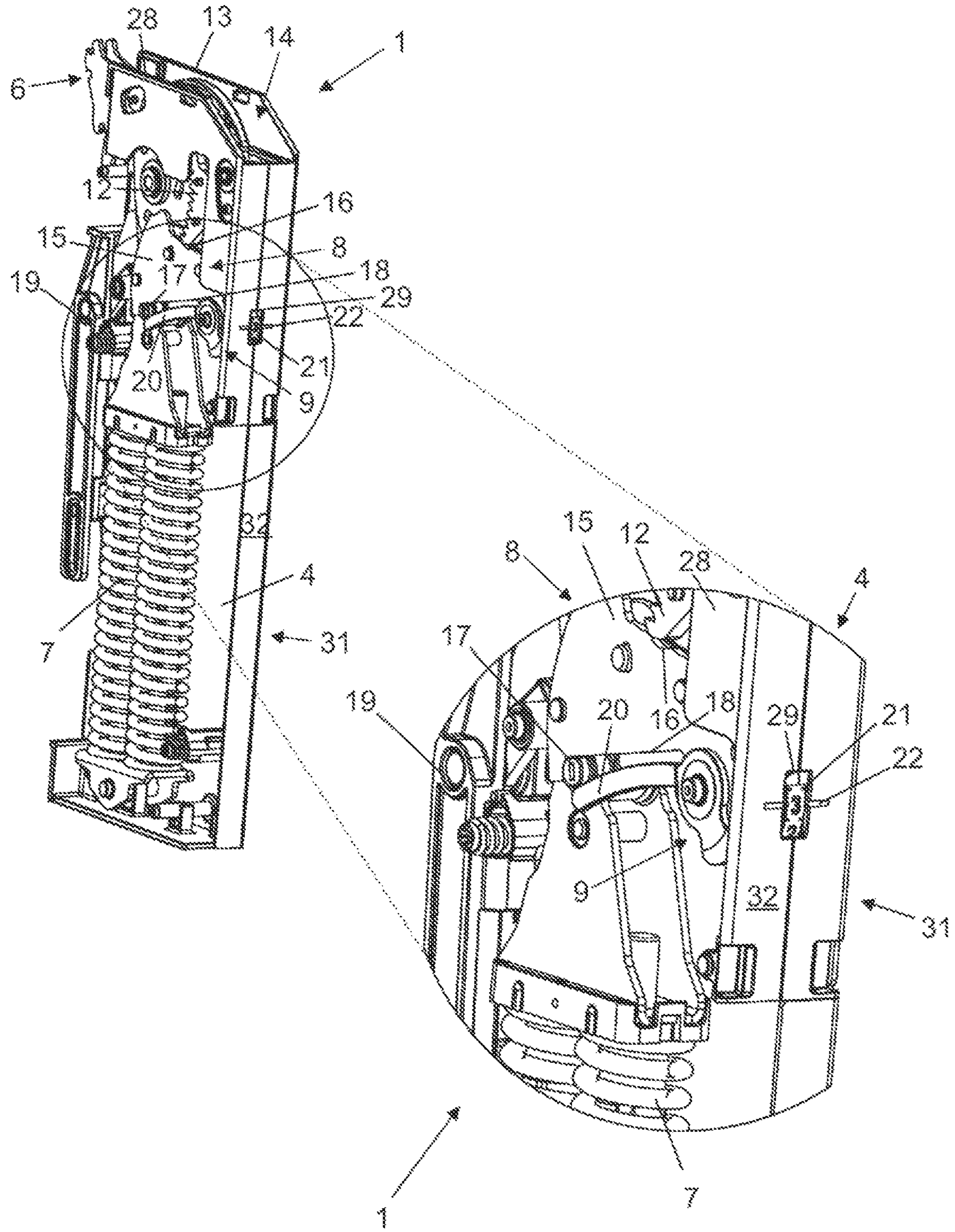
FIG. 4 shows the furniture drive according to the embodiment according to FIG. 1_a_ in a further perspective view with an enlarged detail of the underside of the housing, FIGS. 5_a_-5_b_ show an exploded representation of component parts of the setting device, the display device and the housing and an enlarged representation of the display device in a perspective view, FIGS. 6_a_-6_b_ show the setting device, the display device and a part of the housing of the furniture drive according to FIG. 1_a_ in a side view and a view from underneath with an enlarged detail of the display device, FIGS. 7_a_-7_b_ show the setting device, the display device and a part of the housing of the furniture drive according to FIG. 2_a_ in a side view and a view from underneath with an enlarged detail of the display device.

FIG. 4 shows the furniture drive 1, wherein the scale 21 is moved by comparison with the markings 22, relative to the position in FIG. 3. Compared with FIG. 3, the force setting has been changed by the setting device 8 by displacement of the energy storage device 7 via the adjustment device 17 along the application line 18 of the transfer member 15. The changed application point of the energy storage device 7 on the actuating arm 6 causes a deviating force transmission torque, whereby the force setting is increased (despite an increase in the pretensioning of the energy storage device 7).

Due to the movement of the adjustment device 17, the display device 9 was rotated and the scale 21 moved relative to the markings 22. A change of the application point of the energy storage device 7 is coupled kinematically to the movement of the display device 9.

The scale 21 has intervals, wherein arranged within the respective intervals is a numerical figure for interpreting the present interval on the scale 21. Other representations of the present force setting are generally also conceivable, however, wherein the scale 21 is not restricted to the display of the force setting that is shown.

The marking 22 in FIGS. 3 and 4 is in the form of an engraved line. However, other markings such as stuck-on arrows or pointers, for example, via which a force setting can be read through the display device 9, are also generally possible.

Figure 5A:
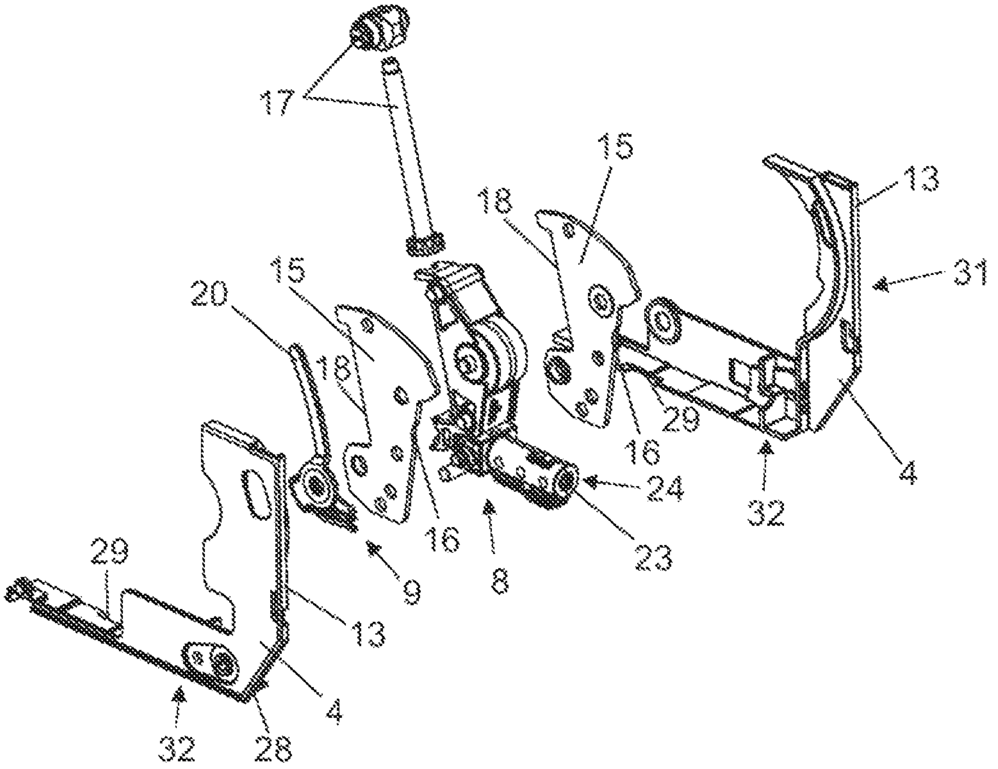

FIG. 5*a* shows the constructional design of some components that are used according to the preferred embodiment of the furniture drive 1 for changing and displaying the force setting.

The setting device 8 comprises a rolling element, which contacts the actuating arm 6 during a movement of the movable piece of furniture and is mounted rotatably on the setting device 8.

Figure 5B:
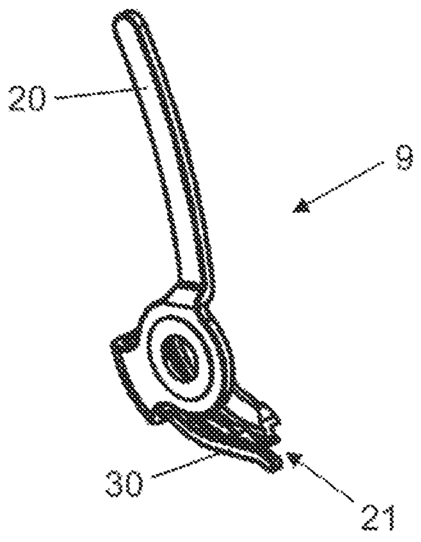

FIG. 5*b* shows the display device 9 depicted in enlarged form, wherein the display device 9 comprises a curved plate-shaped extension 20 in the form of a sheet metal part for transmitting the force setting of the setting device 8 to the display device 9.

The plate-shaped extension 20 is moved by a movement of the energy storage device 7 preferably by way of the adjustment device 17 in a rotating manner relative to the setting device 8, whereby the scale 21 is moved relative to the opening 29.

A restoring element 30 with one free end is connected in a materially-bonded manner to the display device 9, wherein the restoring element 30 pushes the display device 9 in the direction of a starting position unless the display device 9 is pushed by the setting device 8 in an opposite direction. For example, the display device 9 is moved from the starting position into a force setting position, wherein due to the restoring element 30 the display device 9 returns again to the starting position as soon as the force setting position has been cancelled.

The restoring element 30 is formed resiliently and arranged opposite the plate-shaped extension 20. The scale 21 is arranged in parallel laterally adjacent to the restoring element 30 on a rib-shaped extension, wherein the scale 21 and the restoring element 30 are connected to an articulated region of the display device 9 by way of a connecting element arranged between the restoring element 30 and the scale 21 and the plate-shaped extension 20.

Figure 6A:
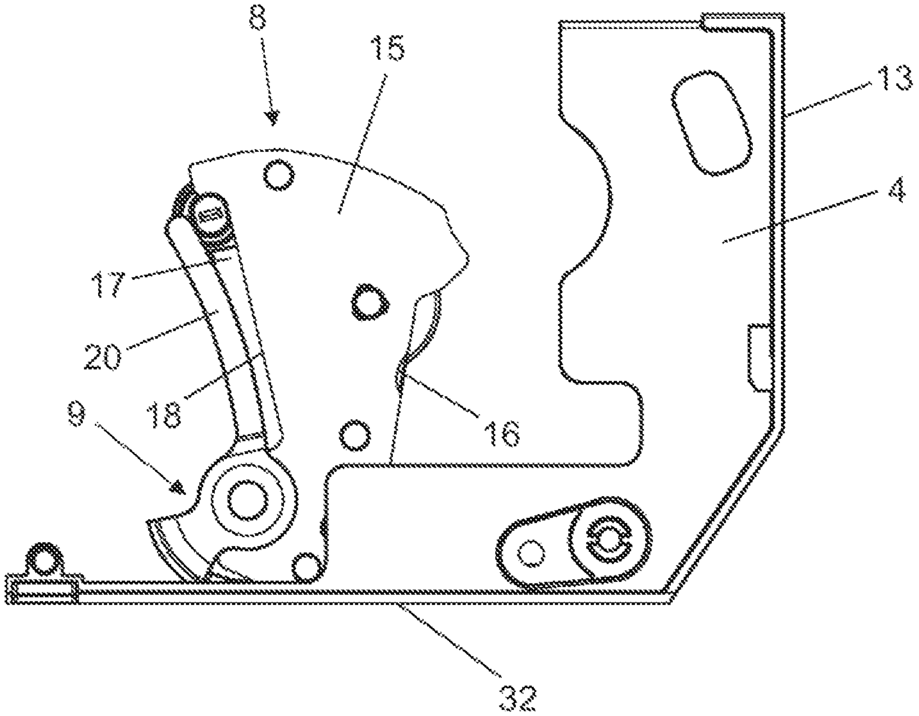

FIG. 6*a* shows the component parts represented in FIG. 5*a* in an assembled state.

Figure 6B:
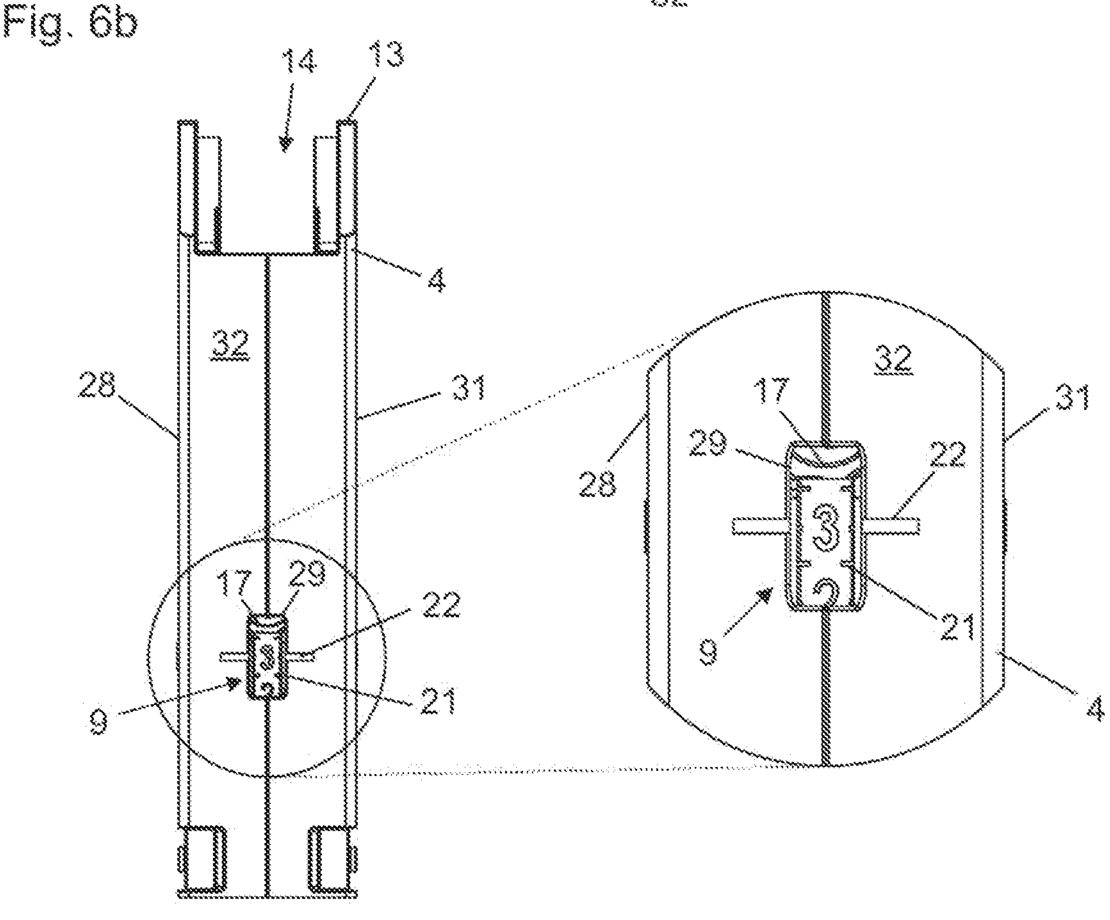

FIG. 6*b* shows the assembled component parts of the furniture drive 1 according to FIG. 6*a* when looking in the direction of the housing side 32. The scale 21 arranged on the display device 9 can be read through the opening 29, whereby the force setting can be deduced.

Figure 7A:
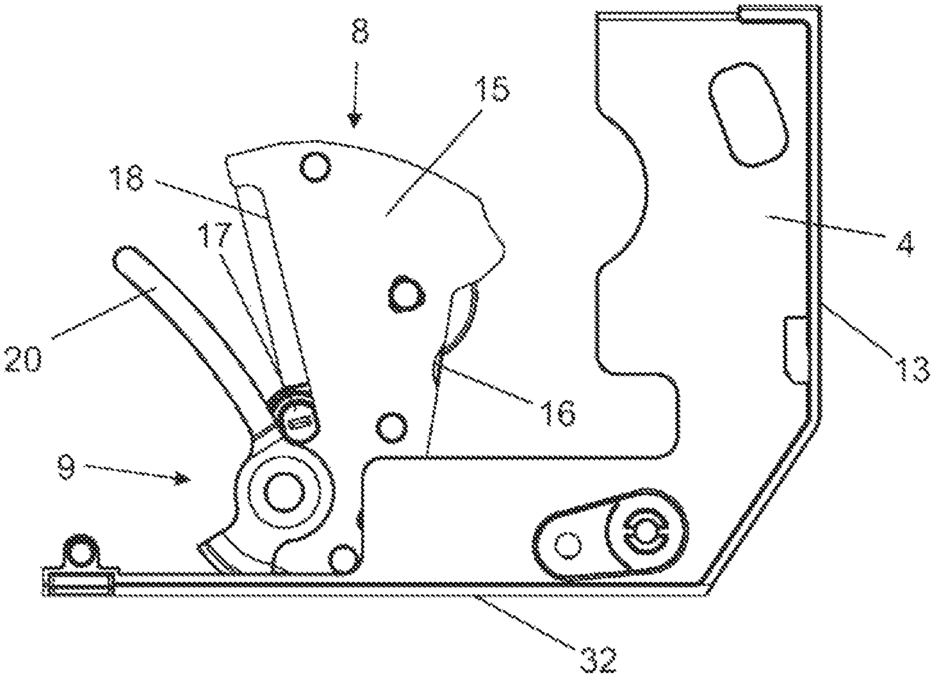

FIG. 7*a* shows the component parts of the furniture drive 1 with a changed position of the display device 9 relative to the markings 22 of the housing 4.

The scale 21 and the plate-shaped extension 20 are formed spatially separate from one another.

Figure 7B:
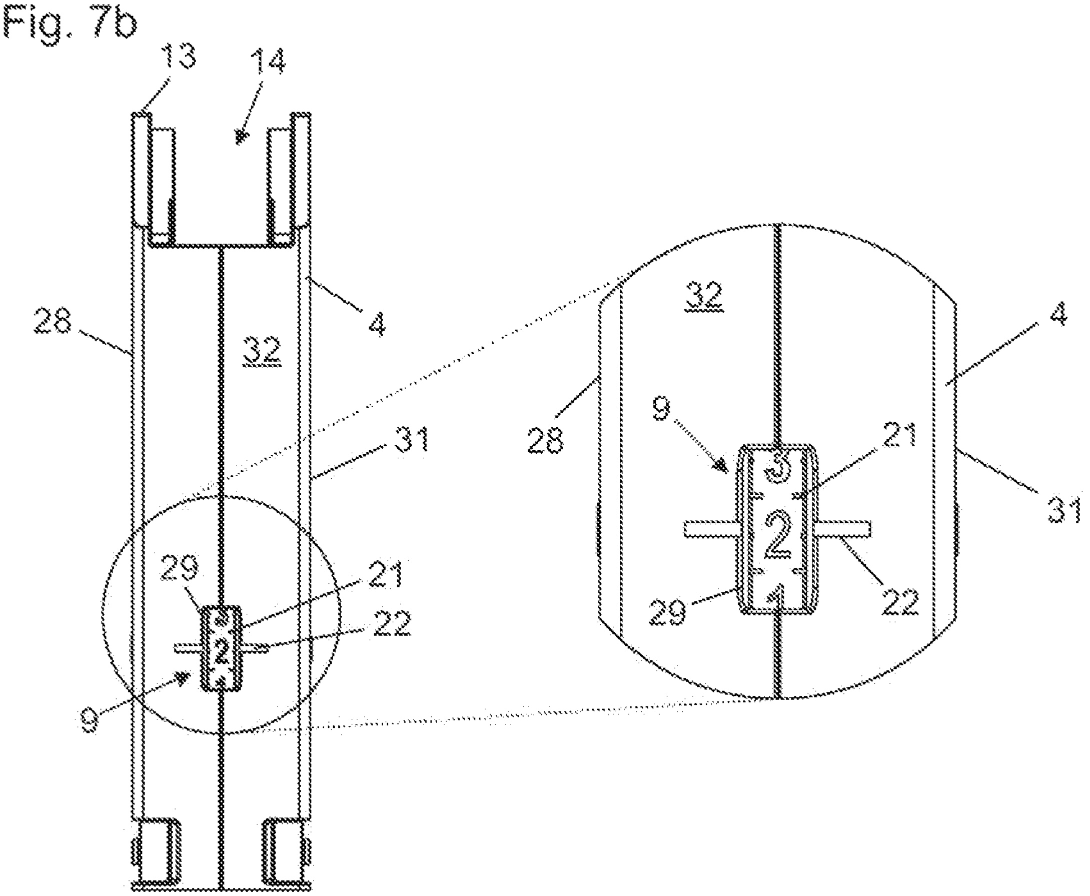

FIG. 7*b* shows that, due to a change of the force setting by the setting device 8, a changed relative position of the display device 9 exists. If the adjustment device 17 is displaced once more into the force setting position identified by “3”, the plate-shaped extension 20 (cf. FIG. 7*a*) is moved by the restoring element 30 likewise into this relative position of the display device 9 by the restoring element 30 being supported on the setting device 8. The restoring element 30 can generally also be supported on another component part, however.

Figure 8:
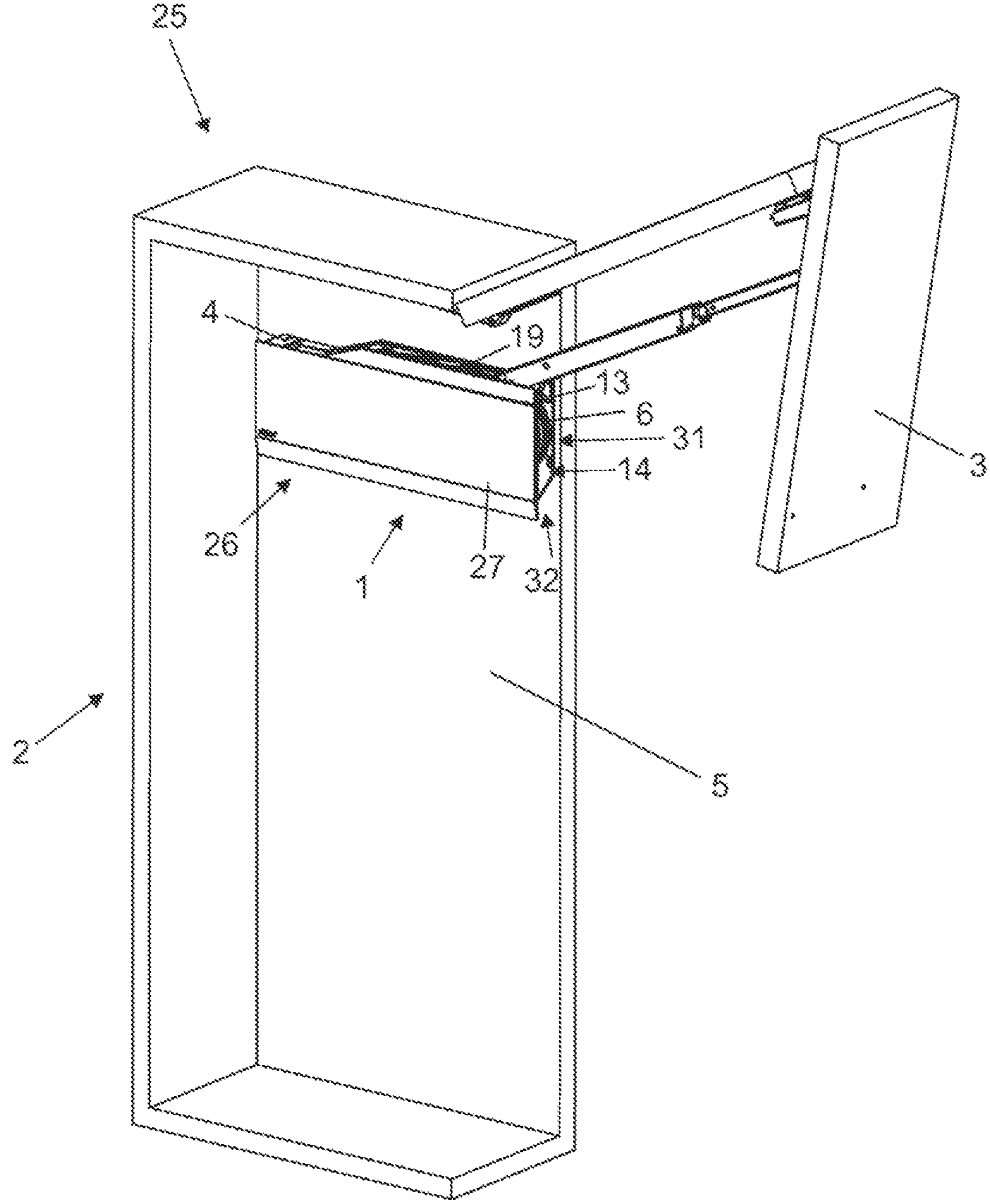
FIG. 8 shows a piece of furniture according to a preferred embodiment with a furniture drive according to the embodiment according to FIG. 1_a_ in a perspective view.

FIG. 8 shows a piece of furniture 25 with a furniture carcass 2 and a furniture part 3 movably mounted relative to the furniture carcass 2 in the form of a furniture flap, which is pivotable about a horizontal axis relative to the furniture carcass 2 in a usage position of the piece of furniture 25.

The piece of furniture 25 has a furniture drive 1, wherein the furniture carcass 2 has a vertically arranged furniture panel 5 and the housing 4 of the furniture drive 1 is arranged on the furniture panel 5. The furniture part 3 is fastened to the movably mounted actuating arm 6 of the furniture drive 1, wherein the furniture part 3 is movable by the furniture drive 1 relative to the furniture carcass 2.

The housing 4 comprises a further housing side 27, wherein the further housing side 27 is arranged parallel to the contact surface 31. One side 28 of the furniture drive 1 can be covered completely by the further housing side 27. The housing side 32 is arranged between the further housing side 27 and the contact surface 31.

Figure 9:
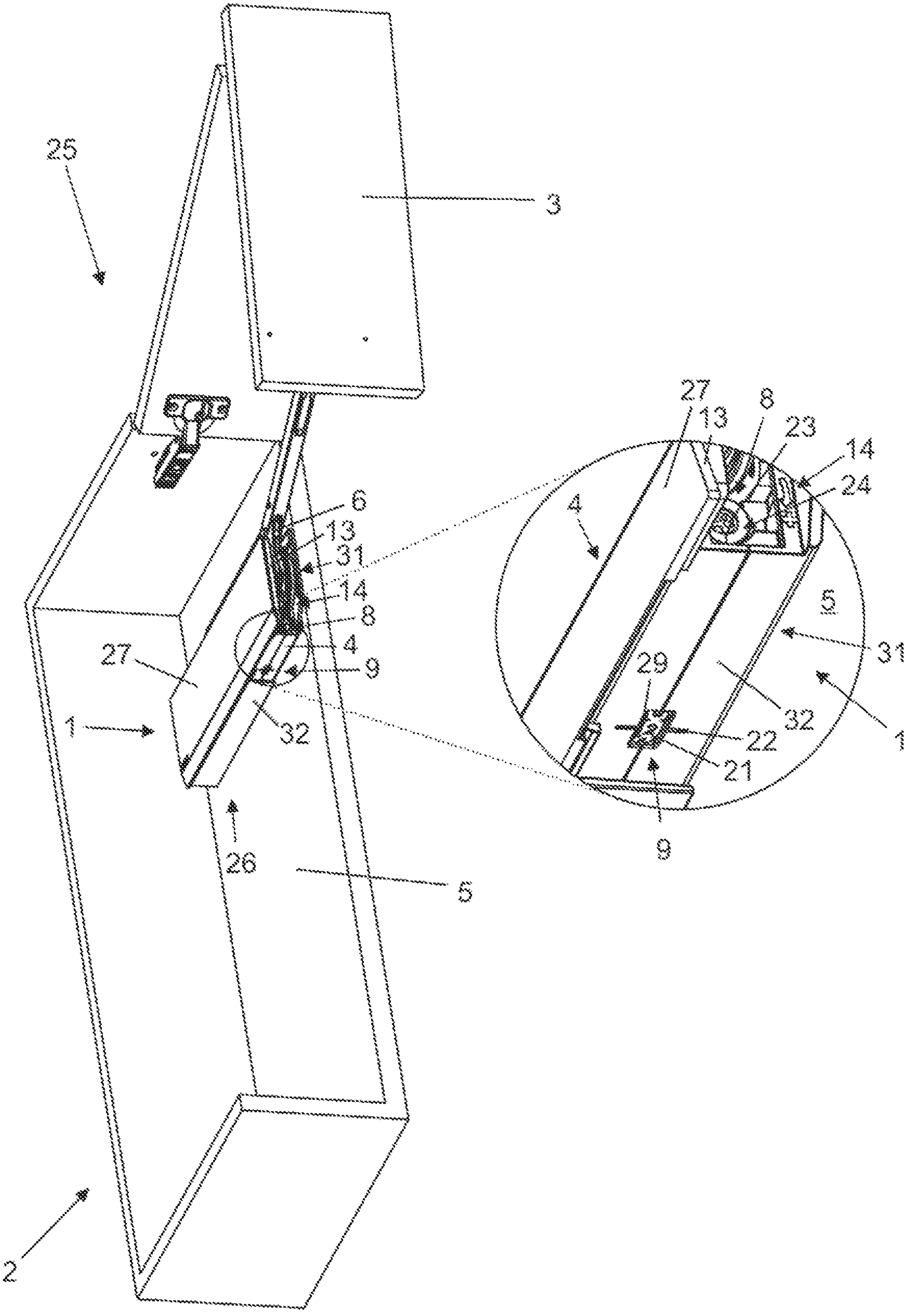
FIG. 9 shows the piece of furniture according to the embodiment according to FIG. 8 in a further perspective view.

FIG. 9 shows the piece of furniture 25, wherein the setting device 8 can be actuated in a usage position 26 of the furniture drive 1, in which the housing 4 is arranged on the furniture panel 5 of the furniture carcass 2, from a front side 13 via a front side opening 14 in the housing 4. The front side 13 is arranged transversely at a right angle to the contact surface 31 and the housing side 32.

The setting device 8 comprises an adjustment device 23 in the form of a tool receiver 24 that can be actuated from the front side, wherein the setting of the force that can be exerted on the actuating arm 6 by the energy storage device 7 can be set by way of the adjustment device 23.

LIST OF REFERENCE NUMBERS

Furniture drive (1)
Furniture carcass (2)
Furniture part (3)
Housing (4)
Furniture panel (5)
Actuating arm (6)
Energy storage device (7)
Setting device (8)
Display device (9)
Toothed wheel (12)
Front side (13)
Front side opening (14)
Transfer Member (15)
Control curve (16)
Adjustment device (17)
Application line (18)
Damping device (19)
Plate-shaped extension (20)
Scale (21)
Marking (22)
Adjustment device (23)
Tool receiver (24)
Piece of furniture (25)
Usage position (26)
Further housing side (27)
Side (28)
Opening (29)
Restoring element (30)
Contact surface (31)
Housing side (32)

The invention claimed is:

1. A furniture drive for moving a furniture part that is-movably mounted relative to a furniture carcass, the furniture drive comprising:

a housing to be mounted on a furniture panel of the furniture carcass, an actuating arm movably mounted relative to the housing and to which the movable furniture part is to be fastened, an energy storage device configured to exert a force on the actuating arm, a setting device for setting the force to be exerted on the actuating arm by the energy storage device, the setting device being configured to be accessed and actuated from a front side of the housing, and a display device configured to display a force setting to be set by the setting device can be displayed, the display device being spatially separate from the setting device, wherein the housing has;

a contact surface to be brought into contact with the furniture panel, and a housing side oriented transversely to the contact surface, both the contact surface and the housing side being stationary in any state of the actuating arm when the housing is mounted on the furniture panel, wherein the display device is arranged relative to the housing side such that the display device is readable when looking toward the housing side, wherein the housing side is located on an underside of the housing when the furniture drive is mounted on a furniture panel.

2. The furniture drive according to claim 1, wherein the setting device is configured to be accessed and actuated via a front side opening in the housing, the front side being transverse to the contact surface and the housing side.

3. The furniture drive according to claim 1, wherein the housing side is a first housing side, the housing having a second housing side, wherein the second housing side is arranged parallel to the contact surface and so as to at least partially cover a side of the furniture drive.

4. The furniture drive according to claim 1, wherein the actuating arm comprises a toothed wheel for moving the actuating arm out of a first relative position into a second relative position separate from the first relative position.

5. The furniture drive according to claim 1, wherein the setting device has includes a transfer member, the energy storage device being arranged on the transfer member, and/or the transfer member being arranged on the actuating arm, and/or the energy storage device is movable along an application line of the setting device to change a force transmission torque on the actuating arm, and wherein the adjustment device is movable via the setting device, and/or a damping device is arranged on the setting device, the energy storage device and/or the actuating arm, being arranged on the housing, and/or the display device is at least partially arranged on the energy storage device and/or the setting device.

6. The furniture drive according to claim 1, wherein the display device is mounted rotatably on at least one of the housing and the setting device.

7. The furniture drive according to claim 1, wherein the display device is at least partially arranged inside the housing.

8. The furniture drive according to claim 1, wherein the display device comprises a plate-shaped extension; configured to transmit a force setting of the setting device to the display device.

9. The furniture drive according to claim 8, wherein the plate-shaped extension is movable by a movement of the at least one energy storage device.

10. The furniture drive according to claim 1, wherein the at least one display device comprises a scale movable relative to the housing when the force to be exerted on the actuating arm by the energy storage device is set by the setting device.

11. The furniture drive according to claim 9, wherein the display device further comprises a scale movable relative to the housing when the force to be exerted on the actuating arm by the energy storage device is set by the setting device, the scale and the plate-shaped extension being spatially separate from one another.

12. The furniture drive according to claim 1, wherein the housing comprises a marking with which a force setting to be set by the setting device is readable through a position of the display device relative to the marking.

13. The furniture drive according to claim 1, wherein the setting device comprises an adjustment device to be actuated from the front side of the housing, wherein the adjustment device is configured to set the force to be exerted on the at least one actuating arm by the energy storage device.

14. A piece of furniture comprising:

a furniture carcass, a furniture part movably mounted relative to the furniture carcass, and the furniture drive according to claim 1, wherein the furniture carcass has a furniture panel, and the housing of the furniture drive is mounted on the furniture panel, and wherein the furniture part is fastened to the actuating arm of the furniture drive such that the furniture part is movable relative to the furniture carcass by the furniture drive.

15. The furniture drive according to claim 4, wherein the toothed wheel contacts the setting device indirectly or directly.

16. The furniture drive according to claim 5, wherein the transfer member is arranged on the actuating arm by a control curve of the transfer means, and/or the energy storage device is movable by an adjustment device along the application line of a transfer member of the setting device to change the force transmission torque on the actuating arm, wherein the adjustment device is movable by the setting device in a translatory manner, and wherein the display device is formed of metal.

17. The furniture drive according to claim 7, wherein the display device is completely arranged inside the housing, and the display device is readable through an opening in the housing.

18. The furniture drive according to claim 9, wherein the plate-shaped extension is a curved sheet metal part.

19. The furniture drive according to claim 9, wherein the plate-shaped extension is movable by a movement of the energy storage device via an adjustment device and in a rotating manner relative to the setting device.

20. The furniture drive according to claim 10, wherein the scale is convex curved.

21. The furniture drive according to claim 12, wherein the display device further includes a scale movable relative to the housing based on the force setting, the force setting being readable through a position of the scale relative to the marking.

22. A furniture drive for moving a furniture part movably mounted relative to a furniture carcass, the furniture drive comprising:

a housing to be mounted on a furniture panel of the furniture carcass, an actuating arm movably mounted relative to the housing and to which the movable furniture part is to be fastened, an energy storage device configured to exert a force on the actuating arm, a setting device for setting the force to be exerted on the actuating arm by the energy storage device, and a display device configured to display a force setting to be set by the setting device, the display device including a scale and a marking, the scale and the marking being movable relative to each other to indicate the force setting, wherein the housing has:

a contact surface to be brought into contact with the furniture panel, and a housing side oriented transversely to the contact surface, both the contact surface and the housing side being stationary in any state of the actuating arm when the housing is mounted on the furniture panel, wherein the display device is arranged relative to the housing side such that the display device is readable when looking toward the housing side, and wherein the housing side is located on an underside of the housing when the furniture drive is mounted on a furniture panel.

23. A furniture drive for moving a furniture part movably mounted relative to a furniture carcass, the furniture drive comprising:

a housing to be mounted on a furniture panel of the furniture carcass, an actuating arm movably mounted relative to the housing and to which the movable furniture part is to be fastened, an energy storage device configured to exert a force on the actuating arm, a setting device for setting the force to be exerted on the actuating arm by the energy storage device, the setting device comprising an adjustment device configured to adjust a location of an application point at which the energy storage device exerts the force on the actuating arm so as to set the force to be exerted on the actuating arm, and a display device configured to display a force setting to be set by the setting device, wherein the housing has:

a contact surface to be brought into contact with the furniture panel, and a housing side oriented transversely to the contact surface, both the contact surface and the housing side being stationary in any state of the actuating arm when the housing is mounted on the furniture panel, wherein the display device is arranged relative to the housing side such that the display device is readable when looking toward the housing side, and wherein the housing side is located on an underside of the housing when the furniture drive is mounted on a furniture panel.

* * * * *